No. 815,313. PATENTED MAR. 13, 1906.
W. W. SWEENEY.
PORTABLE STERILIZING APPARATUS.
APPLICATION FILED FEB. 13, 1905.
3 SHEETS—SHEET 1.
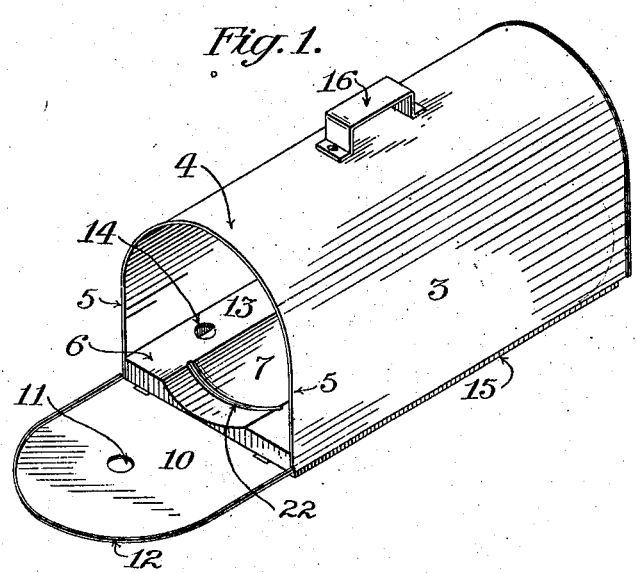
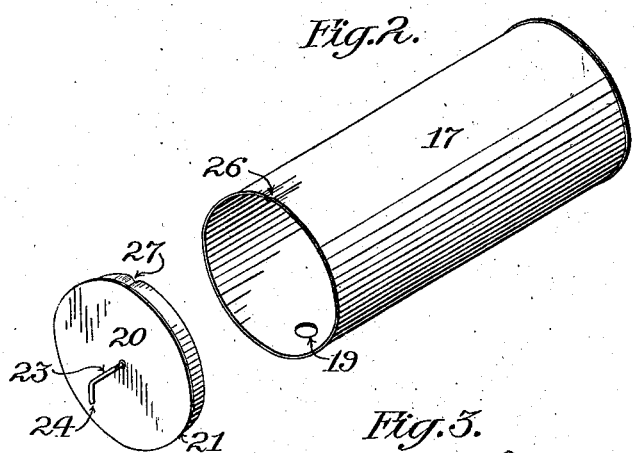
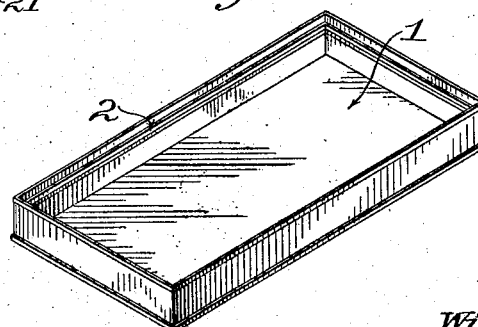
Witnesses:
Frank L. A. Graham
George T. Hackley
Inventor,
William W. Sweeney
by Townsend Bros.
attys No. 815,313. PATENTED MAR. 13, 1906.
W. W. SWEENEY.
PORTABLE STERILIZING APPARATUS.
APPLICATION FILED FEB. 13, 1905.
3 SHEETS—SHEET 2.
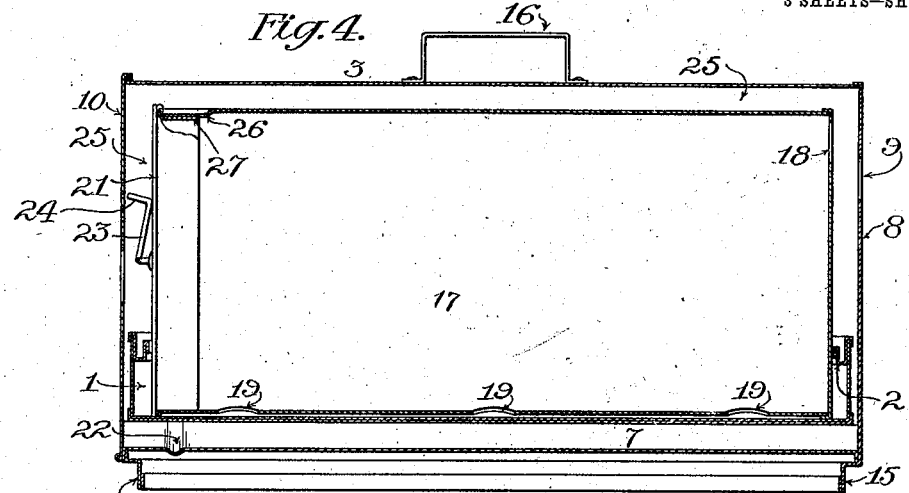
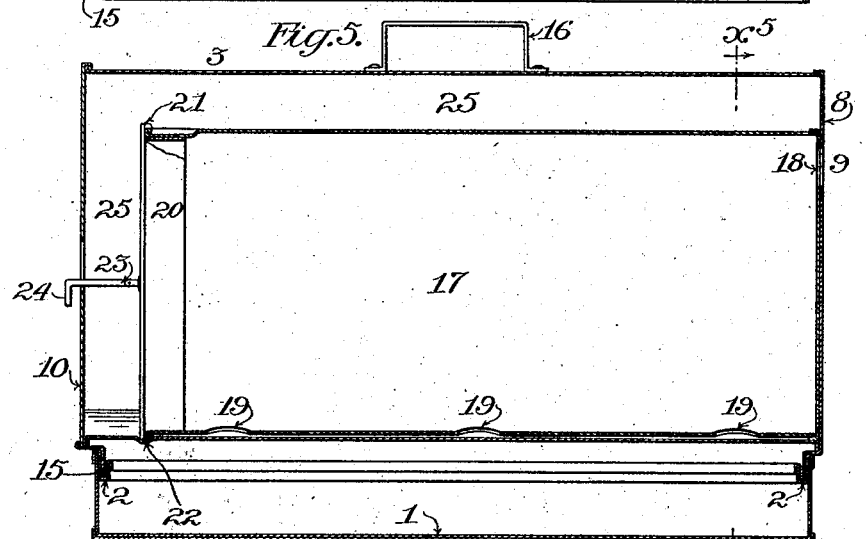
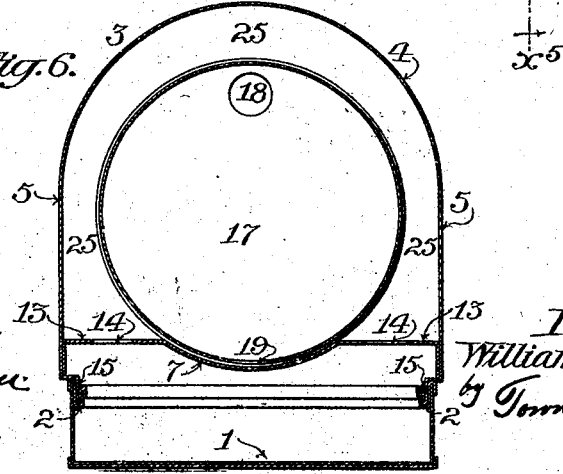
Witnesses:
Frank L. A. Graham
George T. Hackley
Inventor,
William W. Sweeney.
by Townsend Bros.
Attys No. 815,313. PATENTED MAR. 13, 1906.
W. W. SWEENEY.
PORTABLE STERILIZING APPARATUS.
APPLICATION FILED FEB. 13, 1905.

3 SHEETS—SHEET 3.

Witnesses:
Frank L. Graham
George T. Hackley

Inventor:
William W. Sweeney
by Townsend Bros.
attys

UNITED STATES PATENT OFFICE.

WILLIAM W. SWEENEY, OF LOS ANGELES, CALIFORNIA, ASSIGNOR TO PACIFIC SURGICAL MANUFACTURING COMPANY, OF LOS ANGELES, CALIFORNIA, A CORPORATION OF CALIFORNIA.

PORTABLE STERILIZING APPARATUS.

No. 815,313.  Specification of Letters Patent.  Patented March 13, 1906.

Application filed February 13, 1905. Serial No. 245,387.

*To all whom it may concern:*

Be it known that I, WILLIAM W. SWEENEY, a citizen of the United States, residing at Los Angeles, in the county of Los Angeles and State of California, have invented a new and useful Portable Sterilizing Apparatus, of which the following is a specification.

This invention relates to a device adapted for sterilizing surgical instruments or other medical appurtenances, &c., and one object of the invention is to provide a sterilizer in which the parts are so constructed that they may be compactly arranged and housed within the main part of the sterilizer, so as to occupy little space and permit of the sterilizer being readily carried.

Another object of the invention is to provide a novel construction for regulating the admission of steam to the sterilizing-chamber or regulate the escape of steam therefrom, the construction being such that valve mechanism or other delicate devices which are apt to be easily injured or disarranged are eliminated.

Other objects and advantages of the invention will appear in the following description.

The accompanying drawings illustrate the invention.

Figure 7:
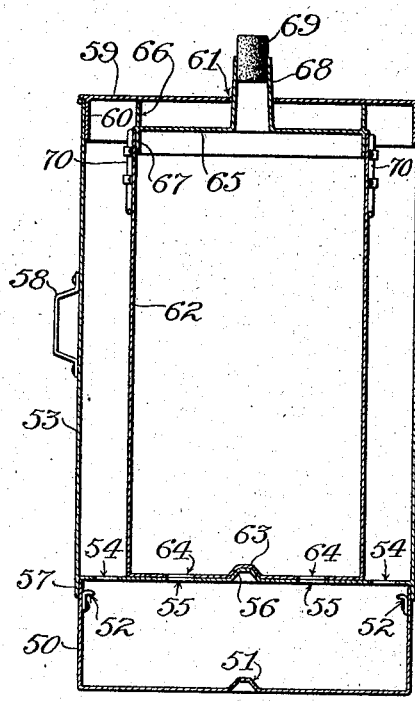
Figure 8:
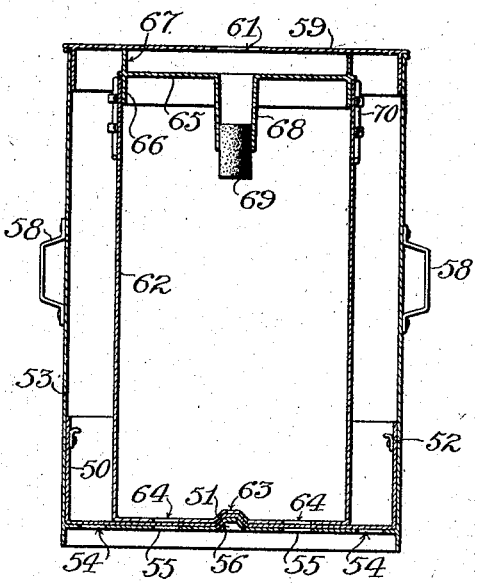
Figure 9:
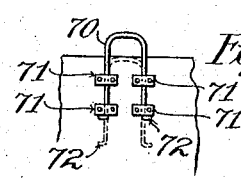
Figure 10:
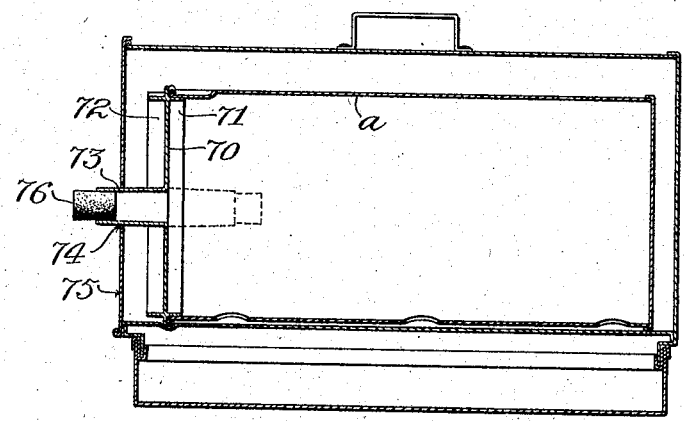

Referring to the drawings, Figure 1 is a perspective view of the main case with the front cover swung open to show part of the interior, the sterilizing-cylinder having been removed. Fig. 2 is a perspective view of the sterilizing-chamber with its head removed a slight distance therefrom. Fig. 3 is a perspective of the tank. Fig. 4 is a longitudinal vertical section of the complete device, showing the parts packed to place the sterilizer in portable condition. Fig. 5 is a longitudinal sectional view through the complete sterilizer, showing the parts arranged in position for use. Fig. 6 is a cross-section on line $x^5 x^5$, Fig. 5. Fig. 7 is a vertical section taken diametrically through a vertical form of the invention, the parts being arranged in position for use. Fig. 8 is a view similar to Fig. 7, the parts being packed. Fig. 9 is a side elevation of a lifting-handle and portion of the sterilizing-cylinder. Fig. 10 is a vertical longitudinal section through another horizontal form of the invention.

1 designates a shallow tank forming a base, the upper rim of which has an inside narrow trough 2. Mounted above the base is a dome or semicylindrical shell 3 with rounded top 4, vertical side walls 5, and a bottom 6, the central portion of which is depressed, forming a concave trough 7. One end of the dome 3 has a closed head 8, provided with a circular orifice 9. Hinged to the front of the dome is a door 10, having a slot 11 and with an inwardly-bent rim 12, which is adapted to clasp over a beaded rim 13 on the end of the dome. On both sides of the trough 7 of the bottom are flat portions 13, each of which in this embodiment is provided with three steam-orifices 14. Projecting down from the bottom of the dome is a rim 15, which is adapted to fit within the trough 2 of the tank when the parts are assembled, as shown in Figs. 5 and 6. A suitable handle 16 is provided on the upper part of the dome, whereby the sterilizer may be carried.

Within the shell 3 and resting upon the concave trough 7 is a sterilizing-cylinder 17, the back wall of which is closed, but having a steam-orifice 18, as shown in Fig. 6, while the bottom wall of the sterilizing-cylinder is provided with three steam-orifices 19. The front end of the sterilizing-cylinder comprises a removable cover 20, and the front rim of the sterilizing-cylinder has a bead 21, which rides in a groove 22, formed in the concave portion of the bottom, as shown in Figs. 1 and 5. Rigidly attached to the removable cover 20 is a shaft 23, having at its end a crank 24, the shaft 23 projecting through the slot 11 of the door 10, so that the crank 24 is in an exposed position, allowing an easy regulation of the sterilizing-cylinder. In order that the crank will always have the same position relatively to the orifices in the sterilizing-cylinder, so that the position of the cylinder can readily be determined by looking at the crank, the cylinder has an indented groove 26, which receives a corresponding indented rib 27, formed in its cover 20.

In use the parts are assembled as shown in Fig. 5, thus forming a steam-space 25 between the front end of the sterilizing-cylinder and dome and in a segmental space around the sterilizing-cylinder. Water is placed in the tank 1. The articles to be sterilized are placed within the sterilizing-cylinder 17. If desired, instruments may be placed directly in the tank 1. The sterilizer may be placed on a stove or heated in any desired manner, and as steam forms it passes up through the orifices 14 and fills the steam-space. The crank 24 is so turned as to place the sterilizing-cylinder into a position in which the steam-orifices 19 will be moved out of contact with the concave floor portion 7 and into communication with the steam-space 25. Steam will then enter from the steam-space 25 through the orifices 19 and filling the interior of the cylinder will sterilize the articles therein. After the contents of the sterilizing-cylinder have been steamed and sterilized for the desired length of time the crank 24 may be turned to bring the orifices 19 over the concave portion 7, thus shutting off the passage of steam therethrough, and to also bring the steam-orifice 18 into register with the dome-orifice 9. The steam in the sterilizing-cylinder will then pass out through the orifices 9 and 18, and after the contents have dried they may be removed by opening the door 10, lifting out the sterilizing-cylinder, and removing the cover thereof. The drying of the contents is hastened by the heat in the steam-space.

When it is desired to pack the parts of the sterilizer so that it is portable, the dome 3 may be removed from the tank 1 and the sterilizing-cylinder then placed within the tank. The tank and sterilizer may then be slipped into the interior of the dome 3, as shown in Fig. 4.

The sterilizing-cylinder 17 should preferably be of a length to just fill the space between the ends of the tank, and the tank should fit lengthwise within the dome, so that when the door 10 is shut the parts will not shift around or rattle.

Figs. 7 and 8 are modifications which show a vertical form of the invention, in which 50 designates a cylindrical tank or base having formed in its bottom an upwardly-projecting conical-shaped pivot 51 and having riveted near its upper rim at diametrically opposite points two small finger-hooks 52. Resting upon the base 50 is a cylindrical outer chamber 53, the bottom of which is provided with two outer steam-orifices 54 and two inner steam-orifices 55, the bottom of the chamber 53 also having a central conical pivot 56, similar to the pivot 51. The lower end of the chamber 53 also has a flange 57, which projects down over the top edge of the base 50 and serves to hold the chamber 53 in position thereon. The chamber 53 is provided with a pair of handles 58, whereby the device may be carried when packed up and which affords convenient means for shifting the apparatus when it is set up for use. The upper end of the chamber 53 has a cover 59 with a flange 60, which closely fits the chamber 53, the cover 59 having a central opening 61. Within the chamber 53 is a cylindrical sterilizing-cylinder 62, the bottom of which has a hollow conical pivot-bearing 63, which is adapted to nest over the pivot 56 and holds the cylinder 62 concentric in the chamber 53. The bottom of the cylinder 62 is provided with two steam-orifices 64, which are adapted to register with the steam-orifices 55 when the steam-orifices are in the position shown in Fig. 7. The upper end of the cylinder 62 has a cover 65 with an upper flange 66 and a lower flange 67, either of which flanges are adapted to fit within the cylinder 62. The cover 65 also has a neck 68, which projects up through the hole 61 into the cover 59, being normally closed by a cork 69. The upper part of the cylinder 62 also has a pair of oppositely-disposed lifting-handles, each handle comprising a U-shaped member 70, the legs of which are slidable in straps 71, riveted or otherwise secured to the cylinder 62. the lower ends of the legs of the U 70 being turned outwardly to form toes 72 for preventing the U 70 from being withdrawn from the straps 71. Fig. 7 shows the manner in which the handles 70 may be pushed down, so that they lie flush with the top edge of the cylinder 62 or may be pulled up above the same when it is desired to lift the cylinder 62 out of the chamber '53. In use the parts are set up as shown in Fig. 7 and water is placed in the base 50, and as steam is generated therefrom it rises through the orifices 54 and fills the space within the chamber 53 around the outside of the cylinder 62. The articles to be sterilized are placed within the cylinder 62, and when the cylinder 62 is so turned that the orifices 54 register with the orifices 55 steam will then pass therethrough into the interior of the cylinder 62 and will sterilize the contents thereof. The supply of steam to the cylinder 62 may be shut off by turning the cylinder by means of the neck 68 slightly, which will bring the orifices 54 out of register with the orifices 55. The steam which is within the cylinder 62 may be allowed to escape therefrom by removing the cork 69. The articles within the sterilizing-cylinder 62 having been sterilized may then be dried by the heat from the steam which surrounds the cylinder. When it is desired to pack the parts, the base 50 is placed within the chamber 53 with its hollow conical pivot 51 nesting over the hollow conical pivot 56. The sterilizing-cylinder 62 is then placed within the chamber 53, so that its hollow conical recess 63 nests over the conical pivot 51 of the base 50, as shown in Fig. 8. The cover 65 is reversed, so that its flange 66 fits the upper end of the cylinder 62. The cover 59 is then placed in position on the upper end of the chamber 53, thus completely inclosing the parts thus positioned. The flange 67 is a trifle narrower than the flange 66, so that when the parts are packed the upper edge of the flange 67 will be flush with the upper edge of the chamber 53, so that the cover 59 when in position will rest against the flange 57, and thus prevent any shaking of the parts within.

Fig. 10 illustrates a horizontal type which is similar in construction to the form shown in Figs. 4, 5, and 6, except that the front end of the sterilizing-cylinder $a$ is provided with a cover 70, having an inner flange 71 and an outer flange 72 and having a neck 73, which extends through the hole 74 in the outer cover 75, the neck 73 being closed by a cork 76. In this form the back wall of the sterilizing-cylinder $a$ is closed, and when it is desired to allow the steam to escape from the sterilizing-cylinder $a$ the cork 76 may be pulled out. When it is desired to pack the parts, the cover 70 may be reversed in position in the sterilizing-cylinder, as indicated by dotted lines in Fig. 10. The sterilizing-cylinder may then be placed in the main steam-dome.

What I claim is—

1. In a sterilizing apparatus means forming a steam-space, a sterilizing-cylinder therein having an opening for steam, and means for moving the cylinder bodily and shutting the steam-opening.

2. In a sterilizing apparatus means forming a steam-space, a sterilizing-cylinder therein having steam inlet and outlet orifices, and means for moving the cylinder bodily to close one orifice and open another.

3. In a sterilizing apparatus means forming a steam-space, a sterilizing-cylinder revoluble therein and having steam inlet and outlet orifices, and means for rotating the cylinder to close one orifice and open another.

4. In a sterilizing apparatus means forming a steam-space, a sterilizing-cylinder therein having an opening for steam, and means for moving the cylinder bodily and shutting the steam-opening, and a water-tank under said means.

5. In a sterilizing apparatus means forming a steam-space, a sterilizing-cylinder therein having an opening for steam, and means for moving the cylinder bodily and shutting the steam-opening, a water-tank under said means, the cylinder being of a size adapted to fit into the tank, and the tank and cylinder combined being of a size adapted to fit within said means.

6. In a sterilizing apparatus a shell the bottom of which has a concave trough, a sterilizing-cylinder resting in the trough and having steam-inlet orifices adapted to be shut when over the trough and to be opened when away from the trough.

7. In a sterilizing apparatus a shell the bottom of which has a concave trough, a sterilizing-cylinder resting in the trough and having steam-inlet orifices adapted to be shut when over the trough and to be opened when away from the trough, and a removable cover for the sterilizing-cylinder.

8. In a sterilizing apparatus a shell the bottom of which has a concave trough, a sterilizing-cylinder resting in the trough and having steam-inlet orifices adapted to be shut when over the trough and to be opened when away from the trough, the shell having an outlet-orifice for steam, and the end of the sterilizing-cylinder having an outlet-orifice adapted to register therewith.

9. In a sterilizing apparatus a shell the bottom of which has a concave trough, a sterilizing-cylinder resting in the trough and having steam-inlet orifices adapted to be shut when over the trough and to be opened when away from the trough, the shell having an outlet-orifice diametrically opposite the concave trough, and the sterilizing-cylinder having a steam-outlet orifice diametrically opposite the inlet-orifices.

10. In a sterilizing apparatus a shell the bottom of which has a concave trough, a sterilizing-cylinder resting in the trough and having steam-inlet orifices adapted to be shut when over the trough and to be opened when away from the trough, a water-tank having an inside trough near its upper edge, and a flange on the bottom of the shell fitting in the trough in the tank.

11. In a sterilizing apparatus a shell the bottom of which has a concave trough, a sterilizing-cylinder resting in the trough and having steam-inlet orifices adapted to be shut when over the trough and to be opened when away from the trough, a water-tank having an inside trough near its upper edge, and a flange on the bottom fitting in the trough in the tank, the bottom of the shell having steam-inlet orifices in its bottom on both sides of the concave trough.

12. In a sterilizing apparatus a shell the bottom of which has a concave trough, a sterilizing-cylinder resting in the trough and having steam-inlet orifices adapted to be shut when over the trough and to be opened when away from the trough, a cover hinged to the front of the shell and having a slot therein, and a crank attached to the sterilizing-cylinder and projecting through the slot.

13. In a sterilizing apparatus a shell, a sterilizing-cylinder therein, a removable cover for the sterilizing-cylinder, and having a rib engaging an indentation in the shell, and cylinder-operating means attached to the cover.

14. In a sterilizing apparatus a shell, a sterilizing-cylinder therein, a door hinged to the shell and having a slot, a removable cover for the sterilizing-cylinder, and having means coacting with means on the cylinder for providing exact positioning of the cover, and a crank on the cover projecting through the slot in the hinged door.

In testimony whereof I have hereunto set my hand, at Los Angeles, California, this 4th day of February, 1905.

WILLIAM W. SWEENEY.

In presence of—
GEORGE T. HACKLEY,
H. B. ZIEGLER.